United States Patent [19]
Helot

[11] Patent Number: 6,115,247
[45] Date of Patent: Sep. 5, 2000

[54] METHOD AND APPARATUS FOR ALIGNING PORTABLE COMPUTERS OF VARYING WIDTHS IN A VARIABLE WIDTH DOCKING STATION

[75] Inventor: Jacques H. Helot, San Mateo, Calif.

[73] Assignee: Hewlett-Packard Company, Palo Alto, Calif.

[21] Appl. No.: 09/071,053

[22] Filed: Apr. 30, 1998

[51] Int. Cl.[7] .............................. H05K 5/00; H05K 7/00; H05K 1/14; H05K 1/00; A47B 81/00

[52] U.S. Cl. ..................... 361/686; 361/683; 361/686; 361/727; 361/741; 361/756; 312/223.1; 312/223.2

[58] Field of Search .................................. 361/686, 683, 361/727, 741, 756; 312/223.1, 223.2

[56] References Cited

U.S. PATENT DOCUMENTS

| 5,283,714 | 2/1994 | Tsai et al. | 361/683 |
| 5,694,292 | 12/1997 | Paulsel et al. | 361/686 |
| 5,699,226 | 12/1997 | Cavello | 361/686 |
| 5,928,017 | 7/1999 | Lan | 439/159 |
| 6,028,767 | 2/2000 | Lan | 361/686 |

*Primary Examiner*—Leo P. Picard
*Assistant Examiner*—Tung Minh Bui
*Attorney, Agent, or Firm*—Teri G. Andrews; Curtis G. Rose

[57] ABSTRACT

A docking station for a first portable computer and also for a second portable computer, where second portable computer is wider than the first portable computer. The docking station has a base plate and a width variation guide pair, which is compressible to accommodate the width of the second portable computer. The guide pair is not compressible to accommodate the width of the first portable computer.

13 Claims, 4 Drawing Sheets

METHOD AND APPARATUS FOR ALIGNING PORTABLE COMPUTERS OF VARYING WIDTHS IN A VARIABLE WIDTH DOCKING STATION

BACKGROUND OF THE INVENTION

The present invention concerns docking stations for portable computers and more specifically docking stations that have the ability to accept more than one width of portable computers.

Generally a portable computer, such as a notebook computer, a laptop computer or a palm top computer, is optimized to reduce size and weight. This often requires tradeoffs, for example, in the size of the display and keyboard, as well as the number and types of ports which are implemented.

One way to increase the versatility of portable computers is to provide for a docking station. The docking station when connected to a portable computer provides for a number of different types of ports. These ports are used, for example, to drive a large monitor, communicate with various peripherals, provide connection to network, and so on. See, for example, U.S. Pat. No. 5,283,714 issued to Collins Tsai, et al, for "Docking Apparatus for a Portable Computer."

The docking station may reside in a permanent location with ports connected to various devices. When "at the office" a user can take advantage of the power of a full desktop computer by connecting the portable computer to the docking station. When "on the road" the user has the advantage of a lightweight and small sized portable computer.

Portable computers have become very diverse in size, weight, and capability. As can be expected, the more powerful and capable the portable computer, the larger and heavier they become. Although they are all lightweight and small compared to a desktop personal computer, many users desiring a portable computer purchase the heavier of the portable computers to get the functionality they need.

The frequent business traveler may find it convenient to have more than one portable computer. "At the office" there may be a need to do work that requires a more powerful portable computer, for example, intricate graphics or computer aided drafting. On occasion, it may be necessary to do these more sophisticated computing tasks "on the road" as well. For these occasions the user may be willing to carry the heavier, more bulky portable computer on his travels. However, when this business traveler knows he is only going to be doing low power tasks, for example, word processing, it would be a relief to be able to utilize a compact, lightweight portable computer "on the road." With the plummeting costs of these portable computers, the cost is easily justifiable for a second unit by the convenience provided in lightening the load while travelling by using the less powerful, more mobile unit and leaving the heavier, more powerful computer "at the office."

Additionally, many portable computer users find that the portable computer they have chosen does not have the capability they need and would like to upgrade. Other portable computer users find that a lighter, more compact model would better serve their needs and would like to downgrade.

The problem with having more than one portable computer or changing to a different model of portable computer is that it is not likely that they will fit in the same docking station. Currently, each docking station is made for a specific model and size of portable computer. In the case of upgrade or downgrade situations, the requirement of purchasing a new docking station for the new model significantly detracts monetarily from the justifiability of the change. When a user wants two portable computers for varying portability and functionality on the road, the need for two docking station systems (a system consisting of a docking station, a full-sized monitor, and a full-sized keyboard) would make the expense prohibitive, and it would take up valuable desktop space in the user's office.

SUMMARY OF THE INVENTION

A docking station for a first portable computer and also for a second portable computer, where second portable computer is wider than the first portable computer. The docking station has a base plate and a width variation guide pair, which is compressible to accommodate the width of the second portable computer. The guide pair is not compressible to accommodate the width of the first portable computer.

DETAILED DESCRIPTION OF THE PREFERRED EMBODIMENT

Figure 1:
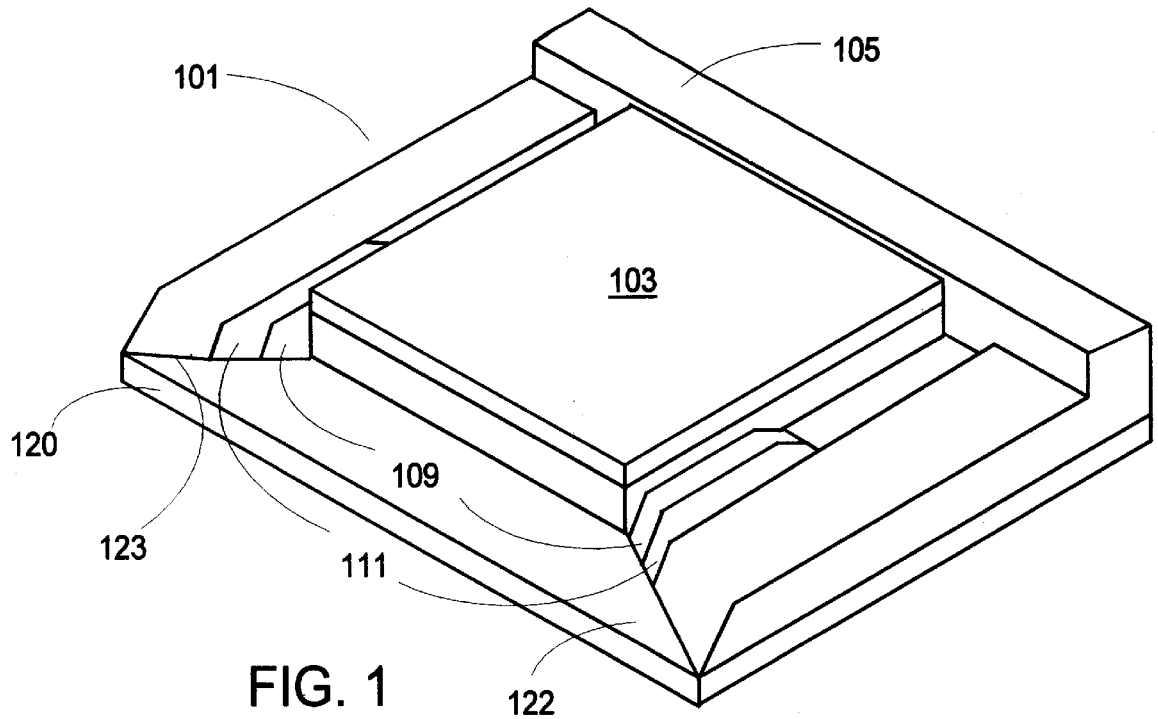
FIG. 1 is a computer system of the preferred embodiment of the invention.

FIG. 1 shows computer system 101 of the preferred embodiment of the invention. Docking station 105 has a base plate 122 and a front entry edge 120. Portable computer 103 is first placed on front entry edge 120 and slid across base plate 122 with angled entry guiding edges 123 used as both a visual a mechanical guide. Other embodiments of entry guiding edges 123 have been contemplated, such as a curved or stepped edge. FIG. 1 illustrates a portable computer 103 of a width requiring first width variation guide pair 107 to be compressed and out of view with portable computer 103 sitting on top of them. Second width variation guide pair 109 and third width variation guide pair 111 are shown in their uncompressed state with the interior edges of second width variation guide pair 109 working as guides to keep portable computer 103 centered to allow connection to docking station 105.

Figure 2:
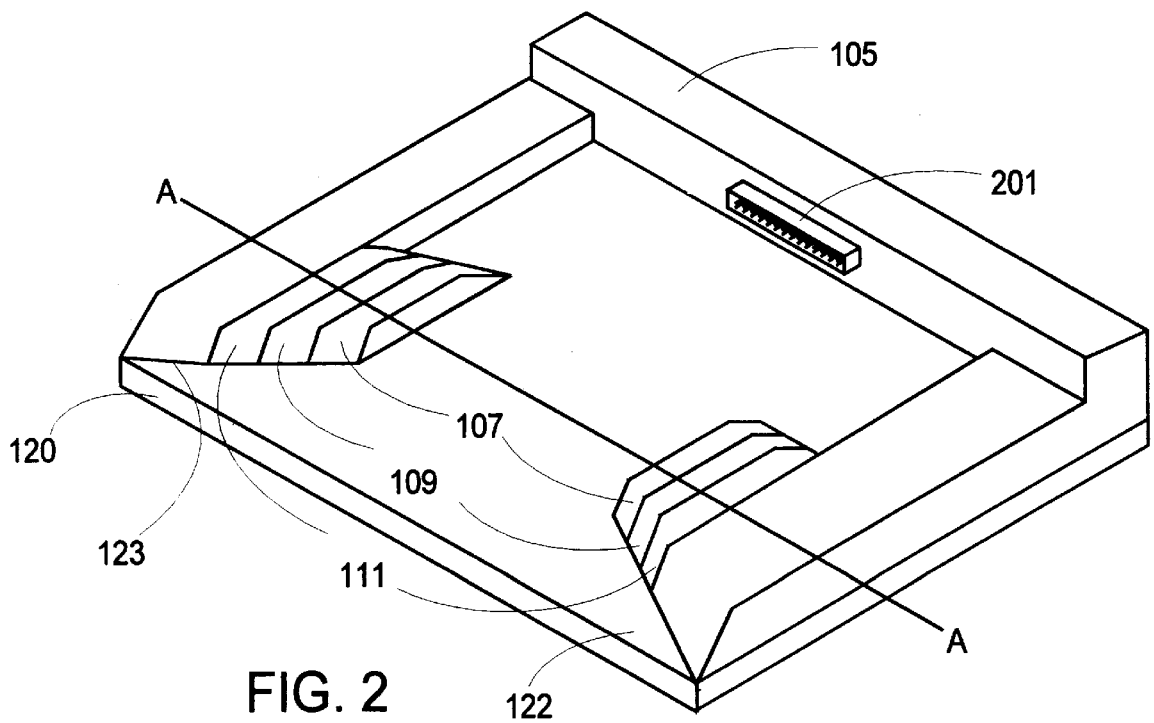
FIG. 2 is the docking station of the preferred embodiment of the invention.
Figure 3:
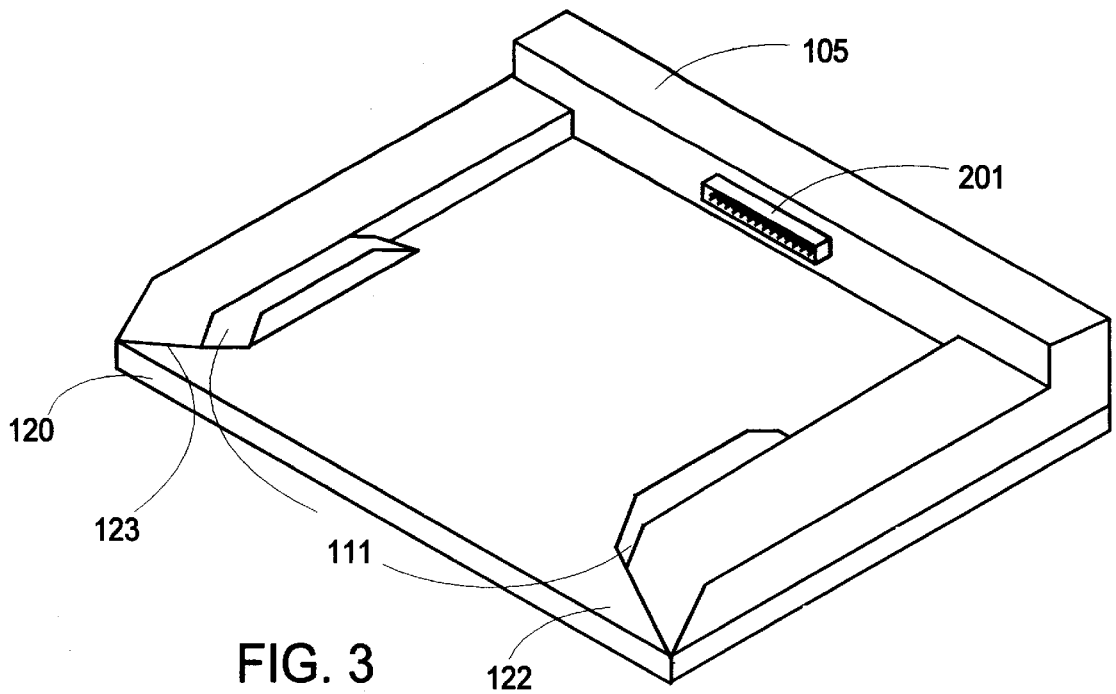
FIG. 3 is the docking station of an alternate embodiment of the invention.

FIG. 2 is the docking station of the preferred embodiment of the invention. Docking station 105 has a portable computer interface connector 201 that connects with a docking station interface connector in portable computer 103. Shown in their uncompressed states is first width variation guide pair 107, second width variation guide pair 109, and third width variation guide pair 111. As those skilled in the art would appreciate, there could be more or fewer guide pairs included in the design of docking station 105 depending on the number of model widths of portable computers the docking station is to designed to support. An alternate embodiment, as shown in FIG. 3, has been contemplated where there is only one variation guide pair. In this embodiment, guide pairs 107 and 109 as shown in FIG. 2 are not present.

Figure 4:
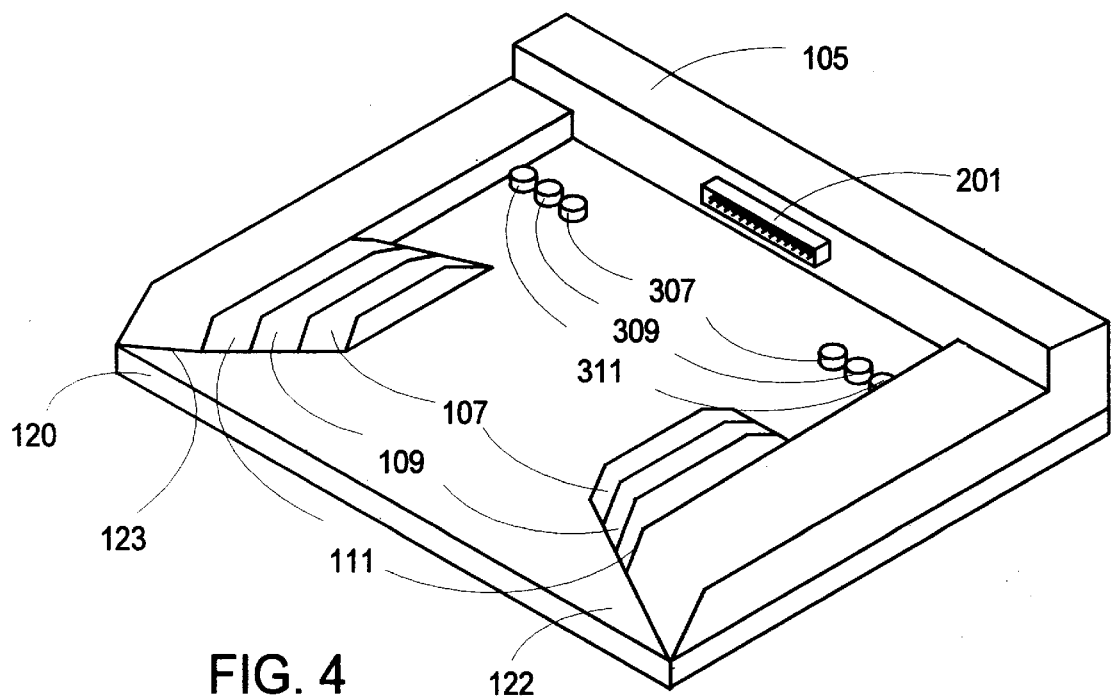
FIG. 4 is the docking station of yet another alternate embodiment.

FIG. 4 is the docking station of an alternate embodiment of the invention. In addition to first width variation guide pair 107, second width variation guide pair 109, and third width variation guide pair 111, a second guide for each variation of width has been added to assist portable computer 103 further on approach to portable computer interface connector 201. In the preferred embodiment of the invention, when first width variation guide pair 107 is compressed, first rear guide pair 307, which is mechanically coupled to first width variation guide pair 107, also compresses. Although first rear guide pair 307, second rear guide pair 309, and third rear guide pair 311 are shown in a round canister shape, an alternate embodiment has been contemplated where they are of a similar shape as first width variation guide pair 107. When using a similar shape that would allow the rear guide pairs to compress from the weight of portable computer 103, it would not be necessary to mechanically couple the front and rear guide pairs.

An additional alternate embodiment of the invention would allow first width variation guide pair 107, second width variation guide pair 109, and third width variation guide pair 111 to be latched down by the user in accordance with the portable computer 103 they are using. In this embodiment, guide pairs 107, 109, and 111 would operate in a manner like conventionally known latchable switches, such as those commonly used for on/off switches for electronic devices (e.g. the on/off switch for the HP DeskJet 1200C printer). As those skilled in the art would appreciate, this would make the variable width docking station 105 a semi-fixed width docking station. If the user purchases a new computer that is of a different width, the width variation guides could be latched or unlatched according to the width requirements of the new portable computer eliminating the expense and inconvenience of purchasing and installing a new docking station to accommodate the new width.

Figure 5A:
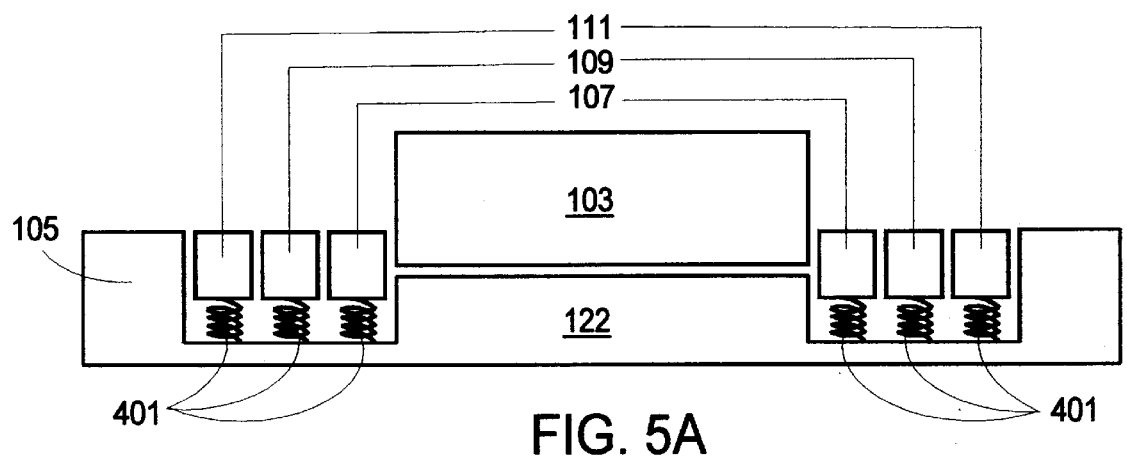
FIG. 5A illustrates the docking station of the preferred embodiment of the invention with a portable computer having the minimum allowable width inserted in the docking station.
Figure 5B:
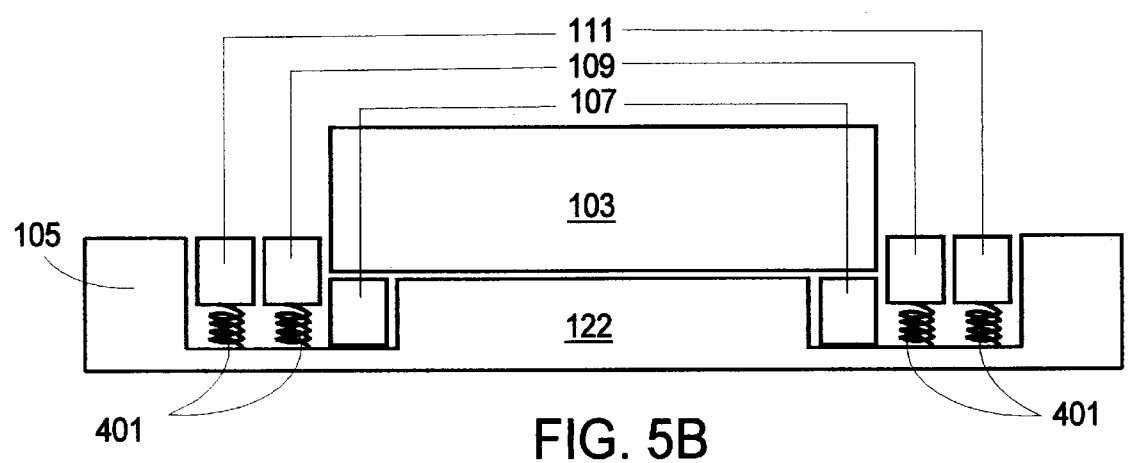
FIGS. 5B and 5C illustrate the docking station of the preferred embodiment with portable computers having two different intermediate widths inserted in the docking station.
Figure 5C:
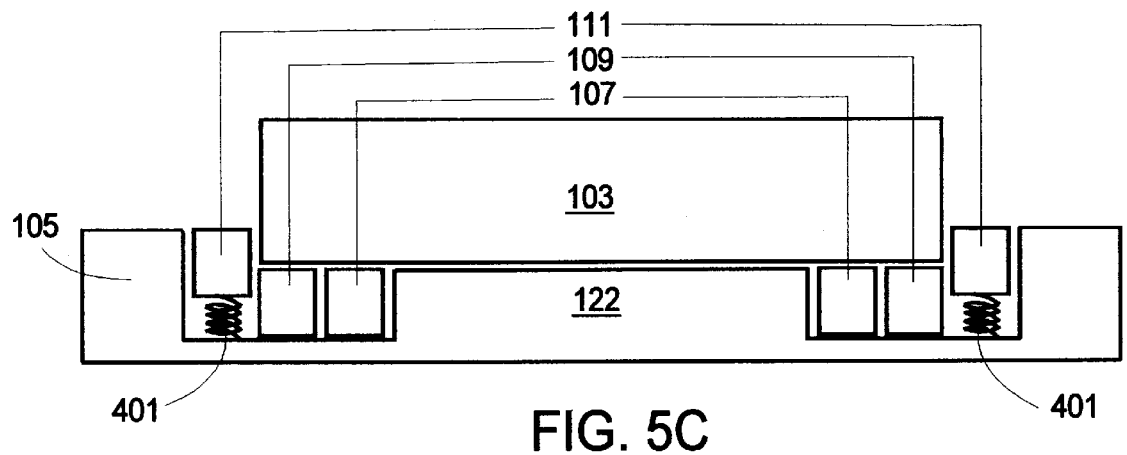
Figure 5D:
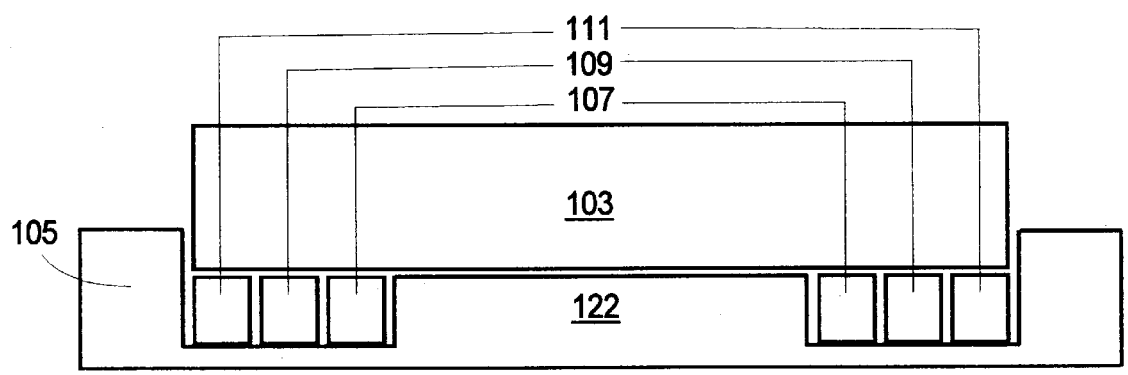
FIG. 5D illustrates the docking station of the preferred embodiment with a portable computer having the maximum allowable width inserted in the docking station.

The docking station 105 of FIG. 5A through FIG. 5D each show three width variation guide pairs. This embodiment with three width variation guide pairs will accommodate four different widths of portable computer. FIG. 5A illustrates the docking station of the preferred embodiment with a portable computer having the minimum allowable width inserted in the docking station. In this case first width variation guide pair 107, second width variation guide pair 109, and third width variation guide pair 111 are all in the uncompressed state. FIG. 5B and 5C illustrate the docking station 105 of the preferred embodiment with portable computers 103 having two different intermediate widths inserted in the dock. FIG. 5D illustrates the docking station of the preferred embodiment with a portable computer having the maximum allowable width inserted in the dock.

As those skilled in the art can appreciate, the number of width variation guide pairs is determined by the number of different portable computer 103 widths the docking station 105 is designed to support. In FIG. 5A through FIG. 5D, width variation guide pair 107, width variation guide pair 109, and width variation guide pair 111 appear to be approximately the same width for illustrative purposes only. They could be wider or narrower according to the widths expected to be used in the variable width docking station 105.

Under each width variation guide is a compressible spring unit 401 that allows the guide to be compressed to a level even with the base plate 122 of docking station 105. An alternate embodiment has been contemplated where each width variation guide pair is both spring loaded and latchable in the compressed state. With the width variation guide pairs necessary to accommodate a particular model of portable computer 103 latched in the compressed state, docking station 105 is semi-permanently set to a width eliminating the need to center and compress width variation guides each time portable computer 103 is inserted in docking station 105.

What is claimed is:

1. A docking station for a first portable computer having a first width and a second portable computer having a second width wider than said first width, said docking station comprising:

a base plate; and a width variation guide pair on said base plate, said width variation guide pair being compressible to accommodate said second portable computer having said second width, but not compressible to accommodate said first portable computer having said first width.

2. The docking station of claim 1, wherein said width variation guide pair is latchable in a compressed state to maintain a semi-fixed width.

3. The docking station of claim 1, wherein said width variation guide pair further comprises a left guide and a right guide.

4. The docking station of claim 1, further comprising:

a second width variation guide pair on said base plate, said second width variation guide pair being compressible along with said width variation guide pair to accommodate a third portable computer having a third width wider than said first width and said second width.

5. The docking station of claim 3, wherein said left guide is mechanically coupled to a rear left guide so that upon compression of said left guide said rear left guide is also compressed, and wherein said right guide is mechanically coupled to a rear right guide so that upon compression of said right guide, said rear right guide is also compressed.

6. The docking station of claim 4, wherein said compressible width variation guide pair is latchable in a compressed state to maintain a semi-fixed width.

7. A computer system, comprising:

a first portable computer; and a docking station for said first portable computer having a first width and for a second portable computer having a second width wider than said first width, said docking station comprising:

a base plate; and a width variation guide pair on said base plate, said width variation guide pair being compressible to accommodate said second portable computer having said second width, but not compressible to accommodate said first portable computer having said first width.

8. The computer system of claim 7, wherein said compressible width variation guide pair further comprises a left guide and a right guide.

9. The computer system of claim 7, further comprising:

a second width variation guide pair on said base plate, said second width variation guide pair being compressible along with said width variation guide pair to accommodate a third portable computer having a third width wider than said first width and said second width.

10. The computer system of claim 8, wherein said left guide is mechanically coupled to a rear left guide so that upon compression of said left guide said rear left guide is also compressed, and wherein said right guide is mechanically coupled to a rear right guide so that upon compression of said right guide, said rear right guide is also compressed.

11. A method for docking a first portable computer having a first width into a variable width docking station, said docking station having a compressible width variation guide pair, a base plate, and a front entry edge, said method comprising the steps of:

- placing said first portable computer on said front entry edge of said variable width docking station;
- centering said first portable computer on said front entry edge of said base plate between said compressible width variation guide pair; and
- sliding said first portable computer into said docking station on said base plate between said compressible width variation guide pair.

12. The method of claim 11, said method also for docking a second portable computer having a second width wider than said first width, comprising the steps of:

- placing said second portable computer on said front entry edge of said variable width docking station;
- centering said second portable computer on said front entry edge on said base plate over said compressible width variation guide pair; and
- sliding said second portable computer into said docking station on said base place over said compressible width variation guide pair.

13. The method of claim 12, further comprising the step of:

- latching down said compressible width variation guide pairs to accommodate said second width of said second portable computer.

* * * * *